Patented Mar. 4, 1941

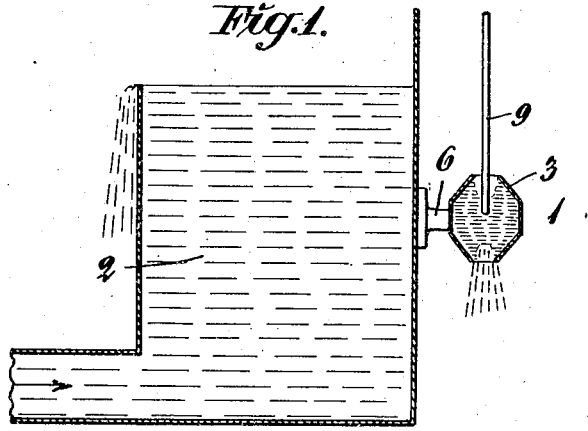
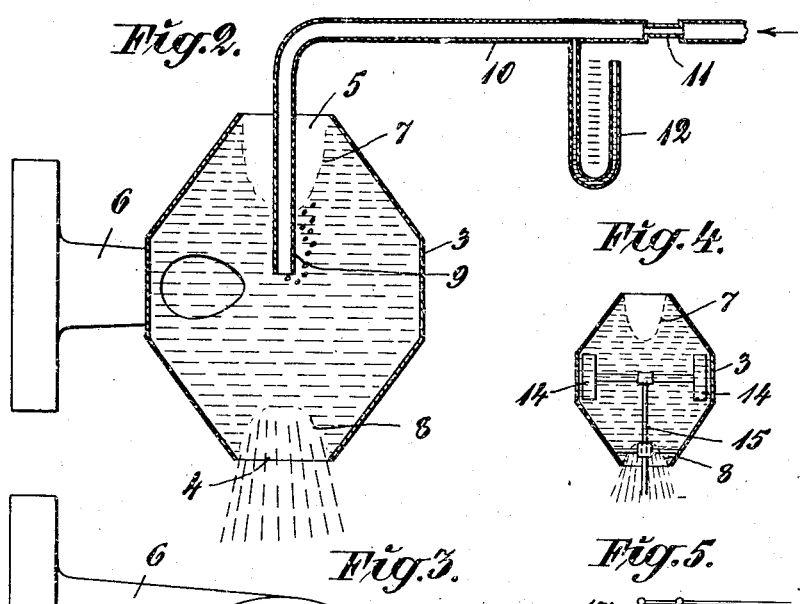
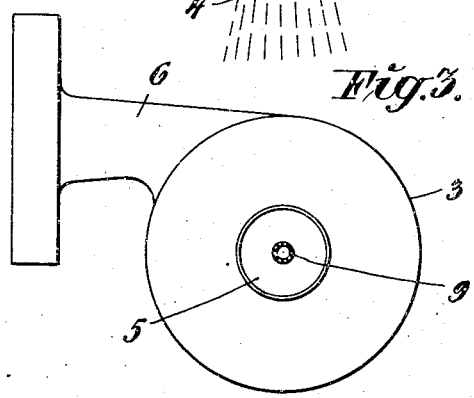

2,233,561

UNITED STATES PATENT OFFICE 2,233,561

APPARATUS FOR INDICATING AND/OR CONTROLLING THE CONCENTRATION OR VISCOSITY OF LIQUIDS OR SUSPENSIONS

Karl Torsten Källe, Säffle, Sweden

Application October 15, 1937, Serial No. 169,334
In Sweden December 18, 1936

5 Claims. (Cl. 265—11)

The present invention refers to apparatus for automatic indication or control of the viscosity or concentration of liquids or suspensions, particularly of fibre suspensions.

The main object of my invention consists in imparting a rotary motion to a liquid in a vessel open at both ends, the opening at the lower end being restricted, and utilizing the variations of the liquid levels caused by variations in the velocity of rotation at different concentrations for the actuation of responsive members.

Another object of my invention consists in effecting the rotation of the liquid by introducing the same tangentially into a vessel having a cylindrical middle portion and tapering conically towards both ends, and utilizing the different shapes of the liquid surfaces or the variations in the distances between the same occuring at different velocities caused by different concentrations of the liquid for actuating responsive members adapted to indicate said variations or to transfer motion to means for regulating the supply of liquid.

Another object of my invention consists in maintaining a constant concentration of a liquid, for instance a fibre suspension in water, by increasing the supply of water if the concentration increases above the desired limit and vice versa. The supply of water is then controlled by regulating means actuated by the variations in the shape of the surfaces of the liquid at different concentrations when the liquid is caused to rotate in a vessel open at both ends and restricted at least at the lower end.

Other features of the invention are set forth in the following specification, in which suspensions, particularly fibre suspensions, are included in the generic expression "liquid."

If the liquid is caused to rotate in a vessel of the kind described and if the concentration of the liquid increases, the friction against the walls of the vessel will be augmented in a corresponding degree, which results in the velocity of the rotating liquid being reduced, so that the surfaces of the liquid assume a flatter shape at the open ends of the vessel and that the distance between them is increased. If, on the other hand, the viscosity or the concentration is reduced, reverse conditions will set in. These differences or variations in the shape of the liquid surfaces or the distance between them are then utilized according to the invention for the direct or indirect actuation of responsive members which, in turn, may be caused to actuate indicating or regulating means for the subject to be controlled.

An embodiment of an apparatus for carrying the invention into effect in the case that the subject to be controlled is constituted by cellulose pulp, that is to say by cellulose fibres suspended in water, is illustrated by way of example in the accompanying drawing.

Fig. 1 diagrammatically shows a vertical section of a container for paper pulp with an indicating device combined therewith. Fig. 2 shows the indicating device in vertical section to a larger scale, and Fig. 3 shows a plan view of the device according to Fig. 2 with certain parts removed. Figs. 4 and 5 show embodiments of modifications.

In Fig. 1, 2 designates a container, through which liquid flows, the condition of concentration or viscosity of which is to be indicated or to be kept constant. The indicating device 1 is arranged laterally of the container and communicating therewith.

In Figs. 2 and 3, 3 denotes a vessel of circular horizontal section, said vessel having at the bottom a restricted opening 4, while at the top the vessel may be freely open or have a similar restricted opening 5. According to the drawing, the vessel 3 thus tapers conically toward the upper as well as the lower end from a cylindrical central portion.

The liquid whose concentration is to be indicated is introduced into the vessel 3 from the container 2 through the inlet 6 which, according to Fig. 3 of the drawing, opens tangentially into the vessel, so that the liquid is brought into rotation on account of its own kinetic energy.

According to the invention a combination of centrifugal force and gravity will act upon the liquid particles, which results in that the liquid adjusts itself at the top to the shape of a paraboloid 7 and at the bottom to the shape of a paraboloid 8. By reason of the effect of the gravity, the latter paraboloid takes a more flattened shape than the first one.

The liquid which enters the vessel 3 and is kept in rotation therein is hurled out through the lower opening 4, whereas at the top no liquid can be hurled out through the opening 5, obviously on the condition that the pressure on the liquid and thus the velocity in the inlet 6 are not increased beyond certain limits.

Now, if the viscosity or concentration of the liquid in the vessel 2 is increased over the desired limit, the friction thereof against the walls of the vessel 3 will increase, the rotational velocity of the liquid being then reduced, so that the paraboloid 7 is subjected to a change in shape and takes a more flattened appearance. This will also be the case with the paraboloid 8. The distance between the apexes of the paraboloids will thus increase. If, on the other hand, the viscosity of the liquid diminishes, the friction against the walls of the vessel 3 is reduced while the rotational velocity is increased, the apex of the paraboloid 7 being then lowered and that of the paraboloid 8 raised, so that the distance between the apexes of the paraboloids 7 and 8 is reduced.

These level differences and various shapes of the paraboloids 7 and 8 appearing at different concentrations or at a varying viscosity of the liquid may now be utilized according to the invention to actuate indicating and/or controlling members making it possible continuously to read off the variations or to actuate other members adapted, for instance to control the supply of diluting agents to the liquid in the conduit leading to the container 2, so that the concentration thereof is maintained constant.

The liquid can be caused to rotate within the vessel in other ways than by introducing it tangentially into the vessel. Fig. 4 shows an embodiment according to which a mechanical stirrer 14 supported by a rotary shaft 15 is used for imparting a rotary motion to the liquid.

As an example of an arrangement to measure and to indicate the alterations in the concentration of the liquid, Fig. 2 illustrates the arrangement of a pipe 10 which is provided with a restriction 11, and the bent branch 9 of which is submerged into the liquid through the opening 5, the same thus extending through the upper paraboloid 7. The pipe 10 is connected to a pressure gauge 12. Now, if an air current is constantly supplied to the liquid through the pipe 10, the resistance to the exit of the air will be dependent on the distance from the lower mouth of the pipe to the apex of the paraboloid 7. With more diluted liquid, this distance will then be smaller, according to the above, and the resistance to the exit of the air smaller than if the liquid is more concentrated, in which case the said distance becomes greater and then the resistance to the exit of the air is increased. These altered conditions cause variations of the pressure in the tube 10 and are indicated by the pressure gauge 12.

If the pipe branch 9 is extended further down into the liquid so as to be approached to the paraboloid 8 at the lower end of the vessel, the air escapes at the bottom, but the same phenomena will then set in, since the distance between the mouth of the pipe branch 9 and the apex of the paraboloid 8 will vary in a manner analogous to that described hereinabove.

For the purpose of maintaining a constant concentration of the liquid flowing through a conduit, means, such as a valve, for regulating the supply of diluting liquid to said conduit are provided and these means are actuated by responsive members under the influence of the variations of the surfaces of the rotating liquid in said vessel.

Fig. 5 schematically shows an example according to which the responsive member consists of a float 16 floating on the surface of the liquid. By means of a rod 17 said float is hinged to one end of a lever 18 pivoted on a fixed shaft 19 the other end of said lever being, by means of motion transmitting devices, connected to the regulating valve. As these motion transmitting devices are commonly known, they are not shown on the drawing.

Also the shape of the vessel 3 need not be that indicated in Fig. 2 of the drawing. The main point is that the vessel is open at the top and at the bottom and is of a circular cross-sectional shape and that the opening provided at the bottom of the vessel is restricted in size. The shape indicated in the drawing, with an upwardly conically tapering portion, is very advantageous, however. If the vessel were cylindrical above the inlet 6, the same would be required to be made very high in order to prevent the liquid from escaping at the top when the said liquid enters the vessel under high pressure and thus at great velocity. Thereby, the liquid column standing above the inlet would be extended so much that the friction of the upwardly attenuated liquid layer would become too great to permit the same to be kept in rotation, so that no paraboloidal shape of the liquid would be produced. On the other hand, if the shape of the vessel shown in Fig. 2 is used, that is to say with an approximately equal conical tapering upwardly and downwardly, the liquid by reason of the rotation and the centrifugal force cannot rise so high, but will be pressed downwardly. Consequently, the friction surfaces of the liquid may be kept comparatively small and constant even at a greatly varying pressure and a greatly varying velocity of the liquid flowing into the vessel.

The invention is not restricted to the forms of embodiment shown, but modifications may be made within the scope of the invention.

I claim:

1. In viscosity apparatus, a circular vessel, means for introducing a liquid into said vessel at a substantially constant rate and for imparting a swirling movement thereto to establish a vortex at the surface of said liquid which is proportional to the viscosity of said liquid and indicating and or controlling means responsive to the variation of the vortex.

2. In viscosity apparatus, a circular vessel open at the top and having a restricted opening at the bottom for drainage, means for introducing a liquid into said vessel at a substantially constant rate and for imparting a swirling movement thereto to establish a vortex at the surface of said liquid which is proportional to the viscosity of said liquid, and indicating and or controlling means responsive to the variation of the vortex.

3. In viscosity apparatus, a vessel having a circular central portion and adjoining tapering portions open at the ends, a receptacle traversed by the liquid and arranged to maintain a substantially constant head, an inlet conduit connecting said receptacle with the vessel and opening tangentially into said vessel for imparting a swirling movement to the liquid to establish a vortex at the surface of said liquid which is proportional to the viscosity of said liquid, a float floating on the surface of said liquid, and indicating and or controlling means responsive to the variation of the vortex.

4. In viscosity apparatus, a circular vessel open at the top and having a restricted opening at the bottom, means for introducing a liquid into said vessel, a stirring member arranged in the vessel for imparting a swirling movement to the liquid therein to establish a vortex at the surface of said liquid which is proportional to the viscosity of said liquid, and indicating and or controlling means responsive to the variation of the vortex.

5. In viscosity apparatus, a circular vessel open at the top and having a restricted opening at the bottom, means for introducing a liquid into said vessel at a substantially constant rate and for imparting a swirling movement thereto to establish a vortex at the surface of said liquid which is proportional to the viscosity of said liquid, a tube submerged below the surface of said liquid, means for forcing a constant current of air through said tube, the pressure in said tube depending on the distance between the lower end of said tube and the surface of said liquid and the variation in the pressure constituting an indication of viscosity.

KARL TORSTEN KÄLLE.